United States Patent [19]  [11] 4,151,241
Bradbury et al.  [45] Apr. 24, 1979

[54] METHOD OF COOLING PELLETS

[75] Inventors: Christopher G. Bradbury, Rumford, R.I.; Walter Buchan, Norton; Gomer E. Kropa, North Reading, both of Mass.; Edward J. Winiarski, Pawtucket, R.I.

[73] Assignee: Leesona Corporation, Warwick, R.I.

[21] Appl. No.: 909,213

[22] Filed: May 22, 1978

Related U.S. Application Data

[62] Division of Ser. No. 748,235, Dec. 6, 1976, Pat. No. 4,099,900.

[51] Int. Cl.² ............................................. B29C 17/14
[52] U.S. Cl. ................................... 264/142; 264/141; 264/143; 264/237
[58] Field of Search ................ 264/141, 142, 237, 143; 425/313, 445, 311

[56] References Cited

U.S. PATENT DOCUMENTS

| | | | |
|---|---|---|---|
| 3,343,213 | 9/1967 | Fritsch | 425/313 |
| 3,415,917 | 12/1968 | Watanabe et a. | 425/313 |
| 3,981,959 | 9/1976 | Cuff | 264/237 |
| 4,046,497 | 9/1977 | Newman | 425/313 |

Primary Examiner—James H. Derrington
Attorney, Agent, or Firm—Robert J. Doherty

[57] ABSTRACT

A pellet cooling system including a novel coolant cage construction and operational manner so as to insure the cooling of warm thermoplastic pellets as they emerge from a die head and are cut by rotating knives is disclosed. After cooling, as by entrainment in coolant flows simultaneously directed peripherally about the cage sides and radially across the front face thereof, the pellets are immediately withdrawn from the cage. Additionally, a feature of the coolant cage is the provision of a novel slinger for distributing a coolant flow evenly over its front face.

7 Claims, 5 Drawing Figures

METHOD OF COOLING PELLETS

This is a division of application Ser. No. 748,235 filed Dec. 6, 1976, now U.S. Pat. No. 4,099,900.

BACKGROUND OF THE INVENTION

This invention relates to a construction and manner of forming thermoplastic pellets, including means for extruding strands of thermoplastic material substantially into an air or other gaseous environment enclosing chamber as contrasted to a liquid coolant submerged system. The strands are cut or broken into discrete particles or pellets by rotating knives, subsequently entrained in coolant flows and thereafter removed from further processing. The invention is particularly directed to a novel pellet cage construction for cooling and collecting such thermoplastic pellets and the manner in which such cooling is performed so as to reduce and/or prevent collision of such pellets prior to or during their cooling. Such action prevents the pellets from sticking together when hot to form multiple clusters thereof. Clusters are undesirable in later processing, such as conveying, weighing and feeding to subsequent extrusion operations.

A number of pellet cage designs are available, generally for the same purposes as above indicated, including that disclosed in U.S. Pat. No. 3,343,213 issued Sept. 26, 1967, which discloses the use of a cooling hood of substantially circular cross section in which pellets emerging from an adjacent extrusion die head are entrained in a single spiraling coolant flow. The pellets are progressively moved from their point of contact with the side walls of the hood forwardly therealong in such spiral motion to an exit at the forward end of the cage. The present applicants have found, however, that by eliminating the forward spiraling progression of such entrained pellets that the dwell time in which the pellets are present within the cage and the length of the cage itself can be substantially reduced and that highly effective cooling to prevent the above-referred-to cluster problem can be produced by the simultaneous provision of multiple coolant flows, one in a peripheral pattern about the inner walls of the cage, and the other in a radially outward pattern to cover the adjacent front face thereof. Newly formed pellets projected against either of such wall surfaces are accordingly immediately entrained in a coolant flow and are thereafter immediately upon completion of their arcuate travel about the periphery of the inner wall surfaces removed from the cage so as to not interfere with the effective cooling and removal of subsequent pellets.

It is accordingly an object of the present invention to provide a coolant cage of novel construction which enables thermoplastic pellets formed by extrusion and cutting means in operative association therewith to be cooled and removed therefrom in a minimum dwell time, yet assuring effective cooling so as to prevent formation of pellet clusters.

A further object of the present invention is the provision of a coolant cage for the receipt, cooling and minimum retention of thermoplastic pellets projected thereinto by an adjacent operatively associated thermoplastic strand extrusion and cutting means, wherein the pellets so projected initially contact either interconnected peripheral side or forward internal surfaces of such cage which cooperatively form a chamber for receipt of such pellets, which surfaces are both simultaneously provided with flows of liquid coolant thereover.

Still another object of the present invention is the provision of a coolant cage construction of the immediately aforementioned type, wherein means are provided for projecting a first coolant flow in a substantially single-path peripheral orbit about and in contact with a major portion of said internal side surfaces, whereby pellets entrained therein are immediately removed from such coolant cage without the necessity of forwardly advancing them along such side walls in a spiral attitude.

Another object of the present invention is the provision of a method of cooling thermoplastic pellets by their receipt and entrainment in one of a plurality of simultaneously provided fluid coolant flows provided about the side and front face internal surfaces of a coolant cage, and thereafter immediately withdrawing such entrained pellets so as to reduce the dwell time therein.

A still further object of the present invention is the provision of a novel slinger device which enables the front face of a coolant cage construction adapted for receipt of thermoplastic pellets emerging from an operatively associated thermoplastic extrusion and cutting means to be provided with an even flow of liquid coolant in an efficient manner with minimal power requirements.

SUMMARY OF THE INVENTION

The above objects are substantially met by the provision of a pellet cage for cooling and collecting thermoplastic pellets formed by the cutting of strands of thermoplastic material emerging from the die face of an extruder or the like by means of rotating cutters or the like which project said pellets in a generally radially outward downstream trajectory, said cage comprising a hood having interconnected peripheral side and forward internal surfaces and positioned with respect to said die face so as to form an enclosed chamber immediately downstream thereof for confining the receipt of said pellets as they are formed, first means for projecting a flow of coolant in a substantially single pass, peripheral orbit about and in contact with a major portion of said internal side surface, and second means for simultaneously projecting a second flow of coolant over and in contact with a major portion of said internal forward surface so as to contact substantially all of said emerging pellets with one or both of said coolant flows to cool them, and means for continuously withdrawing said cooled pellets from said chamber. Additionally, the manner of withdrawing said pellets continuously and generally in less than a single orbit about said peripheral side surfaces contributes to the minimum dwell time in which such effective cooling is accomplished. Furthermore, the provision of a rotating hub or flange construction having a plurality of spaced baffles which are adapted to receive one or more coolant flows directed generally tangentially contributes to the even and complete distribution of coolant about the front face of the pellet cage in a manner effective in achieving desirable cooling action with minimum power requirements.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the invention.

DESCRIPTION OF THE INVENTION

Figure 1:
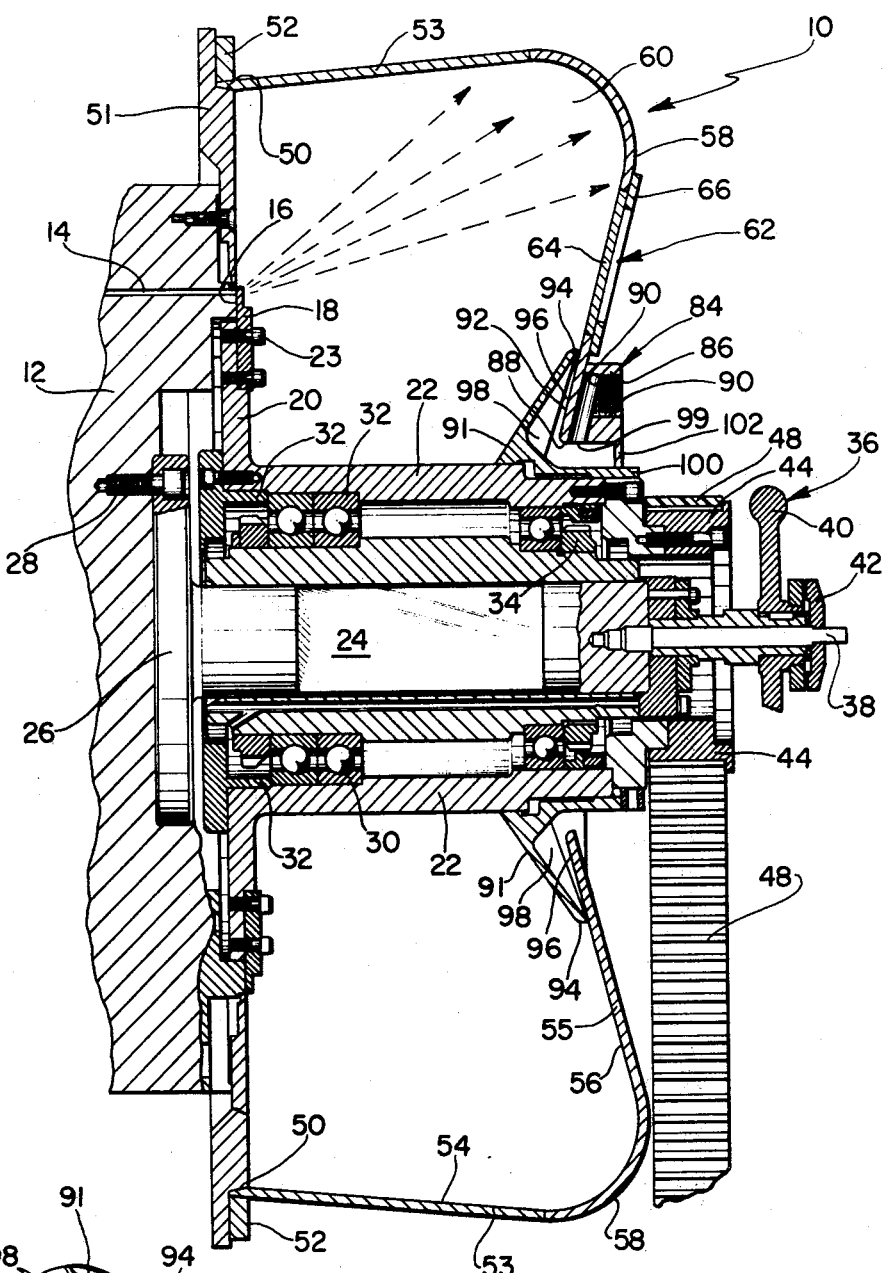
FIG. 1 is a side sectional view of a coolant cage constructed in accordance with the principles of the present invention shown in operative association with an extrusion and cutting means for the formation of the thermoplastic pellets.
Figure 4:
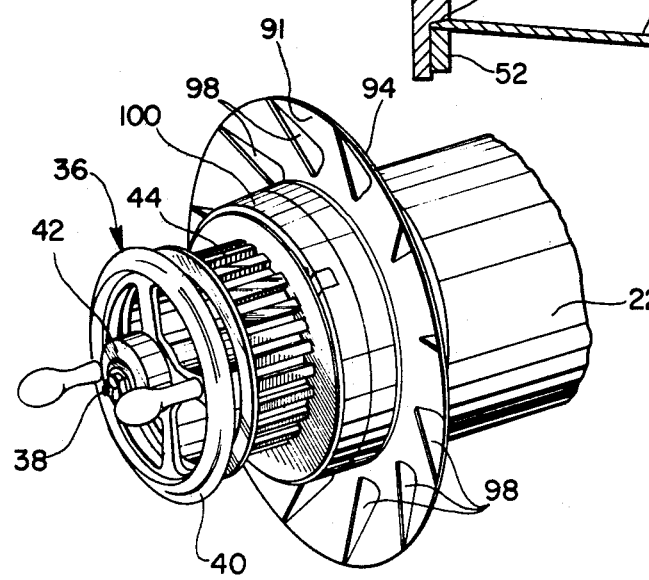
FIG. 4 is a partial perspective view depicting in particular the rotating hub associated with the front die face of the extruder associated with the present invention and further particularly showing the manner in which the front face of the coolant cage receives evenly distributed coolant flow thereover by means of the rotating flange having a plurality of spaced baffles thereon.
Figure 2:
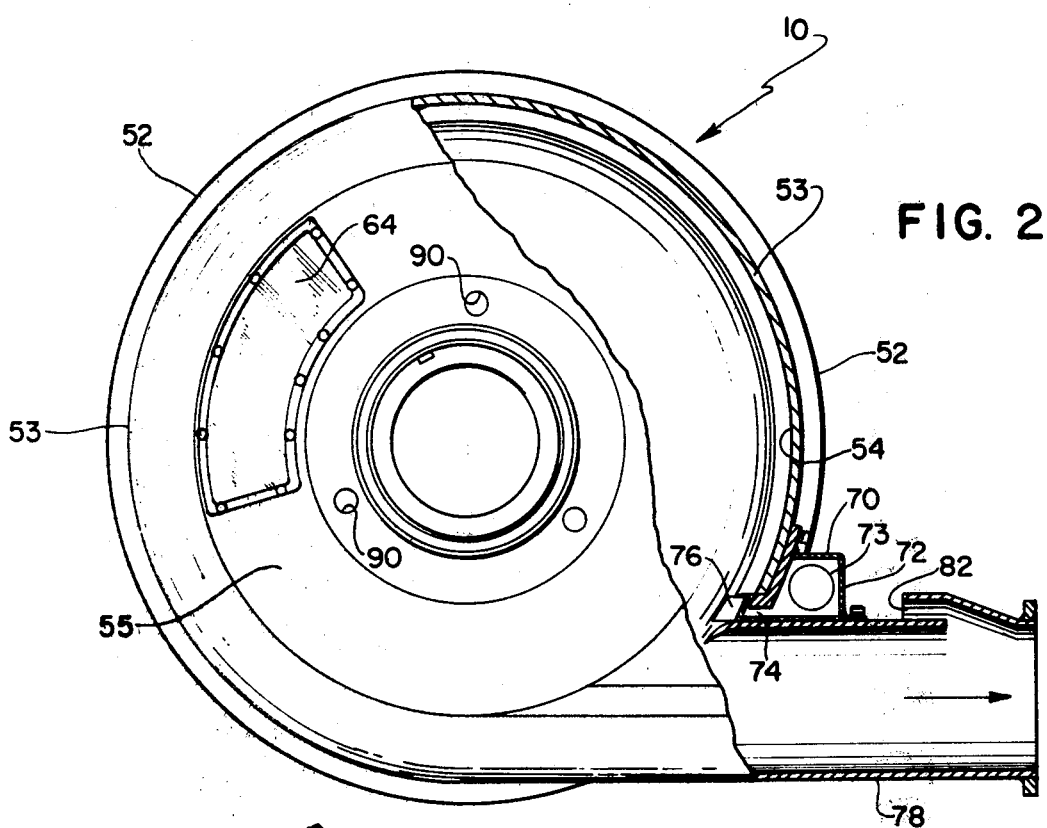
FIG. 2 is a front view with portions broken away from additive illustration of the coolant cage depicted in FIG. 1.
Figure 3:
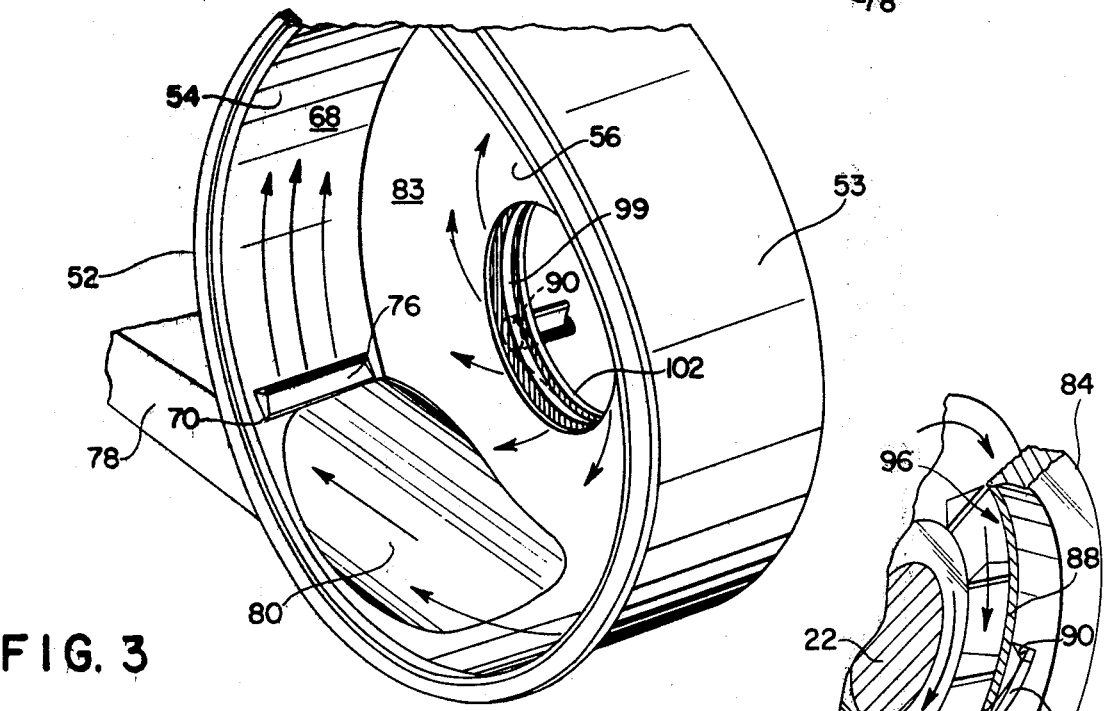
FIG. 3 is an internal perspective view of a portion of such coolant cage construction.

Referring to the drawings and in particular FIG. 1 thereof, the construction of the extruder and cutting means with which the coolant cage 10 of the present invention is adapted for cooperation is best shown as including a die 12 having a plurality of extrusion orifaces 14 circumferentially spaced about the face 16 of such a die and through which strands of thermoplastic resin material are adapted to be extruded. Thereafter, such strands are chopped, broken or similarly cut into discrete pellets by the action of rotating knives 18 passing across the face 16 of such die 12 at those points from which the strand emerges from the extrusion orifices 14. The knives 18 may be fixed in position relative to a generally circular flange 20 of a knife carrier 22 by means of bolts 23. The knife carrier 22 is further adapted for rotation with respect to a fixed hub 24 outwardly extending from central portions of the die face and affixed thereto as by plate 26 and bolt means 28. Bearings 30 positioned between such stationary hub 24 and the rotating knife carrier 22 support such rotation and are maintained in such position by means of bearing retainers 32 which in turn are supported by the knife carrier 22 and lock nuts 34 engaged as by threading to the hub 24. An adjusting means 36 for the longitudinal positioning of the knives 18 with respect to the die face 12 is included and comprise a hub extension 38, an adjustment wheel 40 and retaining means 42. It should thus be apparent that the adjusting means 36 is operative to longitudinally move the knife carrier 22 with respect to the stationary hub 24 in such a manner so that the positioning of the knives 18 with respect to the exit portion of the die orifices 14 may be regulated. The forward end of the knife carrier 22 is further provided with a drive pulley 44 connected thereto as through a drive pulley plate 46, and over which a dive belt 48 is trained so as to provide the rotational force at various speeds by which the knife carrier 22 may be rotated with respect to the hub 24 and the die 12.

The above apparatus may be that or similar to that disclosed in U.S. Pat. No. 3,981,959 and commonly assigned to the assignee of the present invention and may further include the formation of the present thermoplastic pellets by the novel "Die Quench" TM cooling system disclosed in such patent. It should be clear that as the strands of thermplastic i.e. resin polymer emerge from the die orifices 14 that the rotational action of the cutter knives 18 in combination with the forward drive of such strands from the extruder will project the thus-formed pellets radially forwardly of the die face in composite trajectories determined by such factors as the extrusion rate and the speed at which the knives are rotated. In order to capture and collect such formed pellets, the coolant cage 10 constructed in accordance with the present invention is provided.

Such coolant cage may be of generally cylindrical or conical configuration that is adapted for nonrotational fixed support adjacent the front face 16 of the die 12 as by engagement with ledge 50 of a circumferential plate 51 and a cooperating retaining ring 52. The cage includes a peripheral side 53 forming an internal side surface 54 and a front face member 55 forming an internal forward surface 56. The sides and front face 53, 55 may be of one-piece, integral construction or interconnected by means of a bridging member 58 depicted, it being clear that the internal surfaces 54, 56 compositely form an enclosing chamber 60 in which the pellets so formed are entrapped. In addition, the forward surface 56 may be provided with an access and/or viewing port or ports 62 having a clear window 64 formed of plastic material, such as "Lexan" and the like, retained in position by retainer 66 in such a manner to insure a smooth transition with remaining interior portions of the surface 56. Similarly, the walls 53 of the cage 10 forming the internal side surfaces 54 may be also provided with access and/or viewing ports in order that the granulation process conducted therein may be readily observed and adjustments to operating parameters accordingly made in light thereof.

It may thus be seen that pellets as they are formed will assume various trajectories as above indicated and make initial contact either with the internal side surfaces 54 or the internal forward surface 56. Also, inasmuch as such pellets have at least portions thereof which are hot, and accordingly, should they contact either uncooled cage surfaces or each other while in such uncooled and potentially sticky state, they may form clusters which are undesirable in later processing of the pellets, as, for example, in their use as feed material in final article forming extrusion processes where they are weighed, conveyed and screw injected. It is accordingly imperative that such individual pellets be immediately cooled so that they will not either form clusters or stick to the internal surfaces of the coolant cage.

The present invention accomplishes such objectives by the simultaneous provision in both internal surfaces 54 and 56 of separate coolant flows substantially over these surfaces. In this regard, a first coolant flow 68 is directed about the internal side surfaces 54 in a peripheral orbit by means of a first distributing assembly 70 comprising a housing 72 attached to the outside of the hood, including a conduit 73 to supply cooling fluid under pressure to a channel 74 through the wall 53 and into contact with a diverter element 76 which serves to tangentially force coolant in a thin film in an arcuate path about the inner periphery of the hood side wall surfaces 56. The diverter 76 is of a transverse extent so that the coolant flow 68 is placed substantially across the entire extent of the side wall surface 54. Such housing 70 may be disposed preferably on top of and supported by an exit tube 78 for conveying the coolant entrained particles outwardly of the hood from an exit opening 80 of significant radial extent and similarly extending substantially entirely transversely across said inner wall surfaces 54. At such location, such exit tube 78 may be vented as at 82 to prevent air pressure resistance.

The first coolant entrance means 70 is also preferably disposed immediately proximal the exit opening 80 and in such a manner that the first coolant flow across the internal surfaces 54 is adapted to make substantially a single-pass peripheral orbit thereabout prior to its exit. In this way, then, pellets contacting such side surfaces 54 are immediately entrained in coolant flow 68 to cool them and thereafter conveyed outwardly of the chamber 60 in less than a single orbit of such coolant flow about the internal surfaces 54. Those pellets thus initially contacting surfaces 54 proximal the coolant entrance 70 make substantially a complete orbit while those initially contacting downstream portions thereof will make substantially less than such single orbit. Also, pellets initially diverted into the exit opening 80 will be entrained therein and cooled by the flow of coolant swept thereinto. Although more than one such first coolant entrance means 70 may be utilized, that is, spaced about the periphery of cage side walls 53, one such means positioned as above indicated has been found satisfactory.

Simultaneously, the forward surface 56 is provided with a second coolant flow 83 which is directed radially outwardly from a central point proximal the knife carrier 22 toward the first circumferential moving coolant flow 68 in such a manner so as to converge therewith at the transition portions of the surfaces 54, 56, as at 58, and in this manner not only provide a nonstick, cooled forward surface 56 but further direct pellets initially contacting said surface into the first radial coolant flow 68 so as to assure their prompt exit from the chamber 60. Also dependent on the direction of the radial component of the second component, it will either merge with the first coolant, as when these directions are the same, somewhat smoothly but still believed to produce eddy-type currents and resultant nonlaminar flow creating coolant spray, mist, etc., to enhance cooling entrainment of the pellets, or will, when these directions are opposed, merge less smoothly, causing further spray but believed to consume more energy and having greater potential for pellets to be projected out of the coolant flows into contact with oncoming pellets subsequently formed and in trajectories towards said merging coolant flows. The above operational theory is believed to be consistent with operational experience of the present invention and is set forth for purposes of explanation only, rather than limitation.

Figure 5:
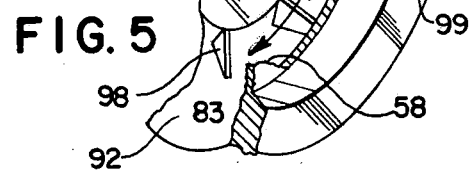
FIG. 5 is a partial perspective view, on an enlarged scale, with portions broken away, showing in particular the manner in which the coolant fluid is introduced to the front face of the coolant cage.

The radial outward second coolant flow is provided by means of a second coolant assembly 84, including a housing 86 adapted for nonrotational fixed support to outer portions of the cage 10, proximal the central opening 88 provided therein for receipt of the hub 24 outwardly projecting therefrom and the rotating knife retaining means 22. Such housing 86 includes one or more conduits 90, there being three depicted in the drawings, for directing a coolant flow radially and tangentially onto the forward surface 56 of the chamber 60 by contact with a spinner or slinger member 91 having an inwardly directed radial flange 92, the forward terminous 94 of which is spaced slightly from the forward surface 56 and in this manner forms a secondary channel 96 for receipt of coolant fluid radially outwardly across the foward surface 56. In order to evenly space such second coolant flow over the forward surface 56, it has been found desirable to incorporate a plurality of spaced baffles 98 which serve to receive such second coolant flow from conduit 90 and project such radially outwardly in an efficient manner. To furthermore conserve energy in accomplishing such outward divergent flow, the conduit 90 is provided with a tangentially disposed secondary conduit 99 and as best shown in FIG. 5. The slinger 91 in turn is fixed to outer portions of the knife retainer 22 by known means and may include a forward extension 100 adapted to sealingly engage a downwardly extending flange 102 provided in the housing 86 so as to block exit of the coolant therebetween. The coolant anticipated for use hereabove is cooled water, although various other coolants as may be appropriate may be utilized.

Thus, upon operation of the device above described, the pellets as they are formed and as they enter the chamber 60 are immediately entrained in a coolant flow regardless on which surface they initially contact, and such coolant flows are regulated in such a manner so that pellets are immediately entrained, cooled and exited from such chamber in an extremely short dweel time and thus are not available for secondary contact with subsequently formed pellets. This action reduces the chance of cluster formation in a highly efficient manner and utilizing efficient, easy-to-reproduce equipment to accomplish the several aforesaid objectives of the present invention.

While there is shown and described herein certain specific structure embodying the invention, it will be manifest to those skilled in the art that various modifications and rearrangements of the parts may be made without departing from the spirit and scope of the underlying invention concept and that the same is not limited to the particular forms herein shown and described except insofar as indicated by the scope of the appended claims. For example, the terms "raidial" or "radially" as used herein mean generally in a radial direction including moving from a central area outwardly towards a peripheral area rather than being limited to travel from a center point along a radius thereof.

What is claimed is:

1. In a method of forming discrete thermoplastic resin pellets by extruding, the improvement comprising directing said discrete thermoplastic resin pellets, at least portions of which are in a hot, sticky condition, radially outwardly and forwardly into initial contact with internal side or forward surfaces of an enclosing chamber, directing a first coolant flow over and in contact with a major portion of said side surface while simultaneously directing a second coolant flow radially outwardly over and in contact with a major portion of said forward surface to entrain said pellets upon initial contact with said chamber in one of said coolant flows, cooling said pellets and thereafter removing substantially all of said pellets from said chamber in less than a single pass peripheral orbit about said side surfaces.

2. The method of claim 1 including slinging coolant from central forward portions of said chamber radially outwardly over said forward surface by means of a rotating flange having a plurality of spaced baffles.

3. The method of claim 2 including directing coolant flow tangentially against said baffles in the rotational direction of said flange.

4. The method of claim 1 including introducing said first coolant flow along a line substantially entirely across the transvert extent of said side surface and removing said entrained cooled pellets at a point essentially immediately upstream adjacent thereto.

5. The method of claim 1 including directing said second coolant flow radially outwardly into comingling contact with forward portions of said first coolant flow.

6. The method of claim 5, the peripheral area where said coolant flows join creating a zone of nonlaminar flow.

7. The method of claim 1 including directing said second coolant flow against said forward surface with a radial component having the same direction as that of said first coolant flow.

* * * * *